Patented June 22, 1954

2,681,922

UNITED STATES PATENT OFFICE 2,681,922

POLYMERIC ZIRCONIUM COMPOUNDS AND METHOD OF PREPARING SAME

Joseph H. Balthis, Mendenhall, Pa., assignor to E. I. du Pont de Nemours and Company, Wilmington, Del., a corporation of Delaware No Drawing. Application April 18, 1951, Serial No. 221,717

11 Claims. (Cl. 260—414)

This invention relates to polymeric zirconium esters and ester carboxylates and to novel methods for effecting their preparation.

More particularly, it relates to new organic solvent-soluble polymeric zirconium esters and polymeric zirconium ester carboxylates and to their preparation by reaction of an organic ester of zirconium with a substantially anhydrous aliphatic carboxylic acid.

It is among the objects of this invention to provide new polymeric zirconium esters and novel methods for preparing such esters. Another object is to provide a highly useful method for preparing new high-molecular-weight polymeric zirconium esters and ester carboxylates possessing unique solubility characteristics in organo, especially hydrocarbon, solvents, and novel solutions of such compounds having desirable surface-active properties which render them adaptable for use in a wide variety of commercial applications. Further objects and advantages of the invention will appear hereinafter.

In accordance with this invention a zirconate of the formula $Zr(OR)_4$, where R is alkyl, cycloalkyl, aryl or aralkyl, is reacted in the presence or absence of an organic solvent with at least 0.5 molar equivalent of a substantially anhydrous aliphatic monocarboxylic acid, the reaction being allowed to continue until the desired polymeric zirconium ester of polymeric zirconium ester carboxylate is formed.

In a more specific embodiment, the polymeric zirconium ester and polymeric zirconium ester carboxylates of this invention are prepared by heating an alkyl ortho zirconate, such as tetraethyl zirconate, and from 0.5 to 4 mols of a straight chain, saturated, aliphatic monocarboxylic acid per mol of ortho-zirconate until a stable, soluble, polymeric zirconic acid ester is formed.

In one adaptation of the invention in which, for example, tetraethyl zirconate is employed as a reactant, the tetraethyl zirconate is suitably mixed with an anhydrous aliphatic monocarboxylic acid, such as stearic acid, in the proportions of from 0.5 to 4 mols of acid per mol of ortho-zirconate. The reactants are then heated for a period of about 1 hour, at a temperature ranging from 50° C. to 112° C., in a reaction vessel, with ethanol formed in the reaction being distilled off in the meantime, advantageously as an azeotrope with a suitable hydrocarbon such as n-heptane, benzene, or toluene. Unreacted acid and by-product ethyl stearate are then removed by vacuum distillation or, preferably, by extraction with acetonitrile or other suitable reagent. If 0.5 mol of stearic acid per mol of tetraethyl zirconate is used, the chief product comprises a dimer, hexaethyldizirconate,

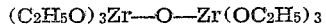
$(C_2H_5O)_3Zr\text{—}O\text{—}Zr(OC_2H_5)_3$

When 1 mol of acid per mol of tetraethyl zirconate is used, an organic soluble polymeric zirconium ester is formed. If two or more mols of stearic acid per mol of ortho-zirconate are used, a high-molecular-weight polymeric zirconium ester containing a considerable number of carboxylate groups is formed, and some degree of branching and ring closure may result. The resulting hydrocarbon solvent-soluble polymeric zirconium esters can be used directly, if desired, without purification or, if preferred, they can be freed from impurities and by-products either by conventional fractional extraction, vacuum distillation, or by other known purification or recovery methods.

The polymeric zirconium ester products obtained in accordance with this invention are colorless to light-brown liquids or solids. They are unique in that they are readily soluble in organic solvents, such as chloroform, benzene, toluene, xylene, etc., and the resulting solutions exhibit novel and desirable surface-active properties.

To a clearer understanding of the invention, the following specific examples are given. These are illustrative merely and are not to be construed as limiting the underlying principles of my invention:

Example I

Stearic acid (396 g., 1.392 mols) and tetraethyl zirconate (0.464 mol) were dissolved in 1300 cc. of n-heptane, and ethanol formed by reaction was distilled off as its n-heptane azeotrope boiling at 70.2–70.6° C. Complete removal of n-heptane in vacuo at steam bath temperature left 466 grams of a light-brown oil which solidified on cooling to a tan solid. Impurities and by-products, e. g., stearic acid and ethyl stearate, were extracted from a 120.3 gram portion of the product by acetonitrile in a conventional continuous type extractor, modified to operate at room temperature. One hundred fifty hours' extraction resulted in removal of 51.6 grams of zirconium-free material. After drying in vacuo, the undissolved purified ethoxy zirconium stearate was a light tan solid which weighed 66.6 grams. Its composition and molecular weight were found to be:

Percent Zr _____ 16.26, 16.17, 16.22
Percent C _____ 61.00, 60.26, 60.51
Percent H _____ 10.11, 9.88, 9.90
Molecular weight _____ 2800, 2700

Although the exact structure of the products obtained is not definitely known, the following structures are consistent with the above analytical data:

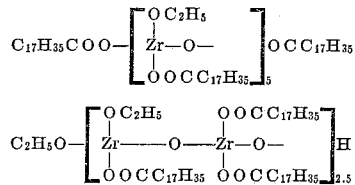

Percent Zr _____ 16.7, 16.2
Percent C _____ 59.8, 60.5
Percent H _____ 10.0, 10.0
Molecular weight _____ 2729, 2821

*Example II*

Linseed oil acids (94.2 g., 0.339 mol, acid number of 202) were dissolved in 500 cc. of anhydrous n-heptane, and tetraethyl zirconate (30.7 g., 0.113 mol) was added. The zirconium ester dissolved immediately. Ethanol formed by reaction was separated by distillation at atmospheric pressure as its n-heptane azeotrope, and n-heptane was completely removed at reduced pressure. The undistilled oily residue (108.8 g.) was extracted with anhydrous acetonitrile for 15 hours in a continuous liquid-liquid extractor. This removed 45.7 g. of impurities consisting chiefly of ethyl linoleate. After drying at reduced pressure, the purified ethoxyzirconium linseed oil acids acylate was a viscous orange-brown oil which weighed 61.9 g. and which corresponded in analysis to:

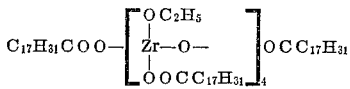

|  | Calc. | Found |
|---|---|---|
| Percent Zr | 16.1 | 16.35, 16.40 |
| Percent C | 61.4 | 60.98, 61.19 |
| Percent H | 9.1 | 9.03, 9.12 |

*Example III*

Anhydrous acetic acid (7.51 g., 0.125 mol) was dissolved in 400 cc. of dry n-heptane, and tetraethyl zirconate (33.93 g., 0.125 mol) was added. The zirconium ester dissolved rapidly, thus indicating immediate reaction. The reaction vessel was attached to a distillation column, and 100 cc. of distillate, boiling at 69.8-97.7° C. was collected over a nine-hour period. The distillate was found by analysis to contain 9.6% by weight ethyl acetate and 8.9% by weight of ethanol. Removal of the remainder of the n-heptane at reduced pressure left 26.5 g. of a white solid which corresponded in analysis to

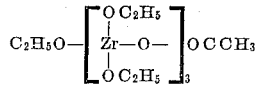

|  | Calc. | Found |
|---|---|---|
| Percent Zr | 40.2 | 40.23, 40.23 |
| Percent C | 28.3 | 27.83, 27.89 |
| Percent H | 5.6 | 5.47, 5.63 |
| Mol. Wt. | 680 | 1,100, 1,100 |

The tetraethyl zirconate used in the above examples was prepared by suspending zirconium tetrachloride (153.4 g., 0.658 mol) by stirring in two liters of anhydrous n-heptane, and absolute ethanol (231.5 cc., 3.948 mol) was added dropwise. The zirconium tetrachloride was thereby converted into an oil which was kept in suspension by continued stirring. Anhydrous ammonia was then admitted in sufficient quantity to precipitate ammonium chloride completely and to render the mixture alkaline. Meantime, the zirconium compounds passed into solution. The ammonium chloride (142.8 g.) was separated by filtration, giving a clear filtrate in which the unusual solubility of the zirconium ester at room temperature was attributed to the excess alcohol or ammonia present. Excess ammonia was expelled by heating and excess alcohol by distillation as its n-heptane azeotrope. The azeotrope boiled at 71° C. Tetraethyl zirconate crystallized on cooling and was separated as a white solid by filtration and dried in vacuo.

Although described as applied to certain specific embodiments, the invention is not to be construed as limited thereto. Thus, instead of tetraethyl ortho-zirconate mentioned in the examples, other organic zirconates corresponding to the general formula $Zr(OR)_4$, and especially those in which R is the non-hydroxyl portion of an aliphatic alcohol containing from 1 to 12 carbon atoms, can be used. Specific examples of ortho-zirconates include methyl ortho-zirconate, ethyl ortho-zirconate, isopropyl ortho-zirconate, amyl ortho-zirconate, octyl ortho-zirconate, dodecyl ortho-zirconate, as well as 2-ethylhexyl, benzyl, cyclohexyl, phenyl, ethoxyethyl and β-naphthyl ortho-zirconates, etc.

Although the preferred acids used comprise the saturated aliphatic monocarboxylic acids, other aliphatic carboxylic acids can be used, including those containing up to 21 carbon atoms. Among specific examples of such acids, those of acetic, propionic, butyric, valeric, caprylic, heptylic, capric, lauric, myristic, palmitic, dodecanoic, oleic, ricinoleic, linoleic, stearic, β-eleostearic, arachidic, and acids derived from drying and semi-drying oils can be mentioned.

The expression "polymeric zirconium ester" as used herein is generic to the simple polymeric zirconium esters and to the polymeric zirconium ester carboxylates.

Although, in obtaining optimum benefits under the invention, I prefer to employ from 0.5 to 4 mols of carboxylic acid per mol of tetraalkyl ortho-zirconate, if desired, amounts of acid up to, say, 5 or 6 mols or higher per mol of ortho-zirconate can be used. However, since no beneficial effects obtain from excess acid use and the excess acid may react with alcohol formed by reaction to liberate water, when such higher amounts are employed, the employment of higher amounts of acids than the indicated preferred range is not recommended.

Although reaction between the ortho-zirconate and the aliphatic carboxylic acid will take place at room temperature, I prefer, because of the better rate of reaction, to employ temperatures ranging from 50° C.–112° C. If desired, however, temperatures below room temperature and as low as 0° C., or as high as 150° C., or even up to 225° C., can be generally used, but these do not result in any compensating advantages.

As noted, the reaction can also be conducted in the presence or absence of organic solvents such as benzene, toluene, xylene, cyclohexane, etc. The concentration of the solution employed is determined solely by the limits of solubility of the reactants. For practical purposes, solutions of as high concentration as possible are employed.

Although the exact structure of the polymeric zirconium esters and zirconium ester carboxylates of my invention is not definitely known to me at present, their composition appears to depend on the ratio of acid to ortho-zirconate used in their preparation, as indicated by the following equations, wherein R is a hydrocarbon radical selected from the group of alkyl, cycloalkyl, aryl and aralkyl, and R' is a monovalent aliphatic hydrocarbon radical containing from 1 to 20 carbon atoms.

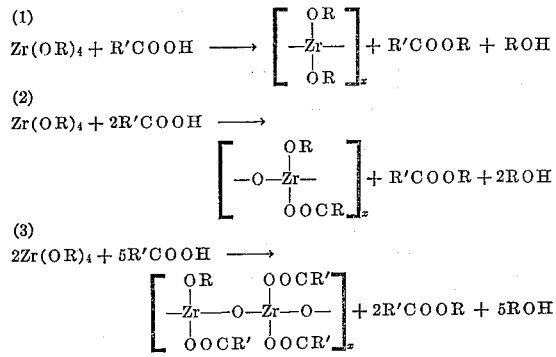

The polymeric zirconium esters of this invention, particularly those made from the long-chain acids (8 through 20 carbon atoms) which are organic solvent-soluble oils or low melting waxes, are uniquely highly soluble in petroleum and other hydrocarbon solvents. These polymeric esters exhibit novel surface-active properties, and find utility, for example, as dispersing agents for various white or colored organic or inorganic pigments and in other applications where surface activity is a prime requisite. In addition to the mentioned use as dispersing agents, the polymeric zirconium ester-carboxylates of this invention are usefully employable as lead scavengers in gasoline, as dry cleaning soaps, rust inhibitors for steel, lubricating oil additives, pour point depressants for lubricating oils, cross-linking agents for polymers, ingredients of water-proofing compositions for fabrics, catalysts for ester interchange reactions, components of cosmetic preparations, plasticizers and modifiers for resinous materials, as additives with flake aluminum in paints resistant to high temperatures, and as milling aids for pigments, especially highly chlorinated or chlorine-free copper phthalocyanines, etc. They are useful for increasing the hardness and reducing the drying time of coating compositions, such as paints, enamels, lacquers, and particularly of alkyd resins. The use of these compositions as rust inhibitors is particularly illustrated by the following:

Two steel panels, 22 gauge, 2¼" x 3½", were pickled in 1:1 hydrochloric acid for about 15 seconds, rinsed in cold running tap water, rinsed in acetone and immersed in the coating solution for 3 minutes at 65° C. The coated samples were then withdrawn at a uniform rate and allowed to dry. The coating solution consisted of a solution of ethoxy zirconyl stearate in a commercial degreasing solvent-trichloroethylene mixture. The solution contained 50 g. of the ethoxy zirconyl stearate per liter. Exposure of the coated panels in a humidity cabinet at 100° F. and 100% relative humidity showed that after 336 hours the coated panels were only slightly rusted as compared to uncoated panels which were completely rusted over their entire surface after 24 hours' exposure under the same conditions.

My novel polymeric ester carboxylates and polymeric esters, and especially the linseed oil acylate, find useful application as ingredients of paint or coating compositions. Thus, ethoxy zirconium linseed oil acylate, prepared as described in Example III, was diluted with xylene and poured onto glass. The film was tack-free in a few hours. Drying was accelerated by addition of catalytic quantities of a cobalt drier, flowouts then becoming tack-free within an hour. The films were found to be desirably adherent, transparent, glossy, hard, and insoluble in xylene.

My novel compositions are also useful as water repellents for fabrics. Thus, cotton sateen fabric was rendered water repellent by padding with a 5% solution of polymeric ethoxyzirconium linseed oil acylate in xylene and drying in air. A higher degree of repellency was achieved by using a xylene solution containing 4% by weight of paraffin and 1% by weight of the zirconium acylate mentioned above, particularly when the impregnated fabrics were baked briefly at 100° C.

I claim as my invention:

1. A method for preparing an organo, polymeric zirconium compound which comprises reacting an organic zirconium ester having the formula $Zr(OR)_4$ in which R is a hydrocarbon radical selected from the group consisting of alkyl, cycloalkyl, aryl and aralkyl, with an anhydrous aliphatic carboxylic acid, employing in the reaction at least 0.5 molar equivalent of acid per mol of ester, and continuing said reaction until the polymeric ester is obtained.

2. A method for producing an organo-soluble, polymeric zirconium compound which comprises reacting an organic ester of zirconium having the formula $Zr(OR)_4$ in which R is a hydrocarbon radical selected from the group consisting of alkyl, cycloalkyl, aryl and aralkyl, with an anhydrous aliphatic monocarboxylic acid, employing in the reaction from 0.5 to 4 mols of acid per mol of ester, and continuing said reaction until said soluble polymeric ester is obtained.

3. A method for preparing a stable, organic solvent-soluble polymeric zirconium ester which comprises reacting an alkyl orthozirconate with an anhydrous, saturated aliphatic monocarboxylic acid, employing at least 0.5 molar equivalent of acid per mol of zirconate, and continuing the reaction until a soluble polymeric ester is formed.

4. A method for preparing a hydrocarbon solvent-soluble polymeric zirconium compound which comprises reacting a zirconate having the formula $Zr(OR)_4$, wherein R is the non-hydroxyl portion of an aliphatic alcohol containing from 1–12 carbon atoms, with an anhydrous, saturated aliphatic monocarboxylic acid containing from 8–20 carbon atoms, employing in the reaction a ratio of from 0.5 to 4 mols of acid per mol of zirconate, continuing said reaction until the desired soluble polymeric compound is formed, and recovering said polymeric product from the reaction products.

5. A method for preparing a stable, soluble polymeric zirconium ester which comprises heating an alkyl orthozirconate in the presence of an anhydrous, saturated aliphatic monocarboxylic acid, employing in the reaction at least 0.5 molar equivalent of acid per mol of orthozirconate, continuing the heating until a soluble polymeric ester is formed, and recovering said ester in purified form from the resulting reaction products.

6. A method for preparing a stable, organic solvent-soluble polymeric zirconium ester which comprises heating, at temperatures ranging from about 50–112° C., an alkyl orthozirconate with from 0.5 to 4 mols of a straight chain, saturated aliphatic monocarboxylic acid per mol of orthozirconate present, continuing said heating until the desired soluble polymeric ester is formed, and recovering said ester in purified form from the resulting reaction products.

7. A method for producing a hydrocarbon-soluble polymeric zirconium ester which comprises reacting an alkyl orthozirconate in the presence of an organic solvent with from 0.5 to 4 mols of a straight chain, saturated aliphatic monocarboxylic acid per mol of orthozirconate present, continuing said heating until the desired soluble polymeric ester is formed, and recovering said ester in purified form from the resulting reaction products.

8. A method for preparing a stable, organic solvent-soluble polymeric zirconium compound which comprises heating tetraethyl zirconate and at least 0.5 molar equivalent of a substantially anhydrous aliphatic monocarboxylic acid, continuing the reaction until the desired polymeric zirconium compound is formed, and recovering said compound in purified state from the reaction products.

9. A method for preparing a stable, organic solvent-soluble polymeric zirconium compound which comprises heating tetraethyl zirconate and at least 0.5 molar equivalent of a substantially anhydrous stearic acid, continuing the reaction until the desired polymeric zirconium compound is formed, and recovering said compound in purified state from the reaction products.

10. A method for preparing a stable, organic solvent-soluble polymeric zirconium compound which comprises heating tetraethyl zirconate and at least 0.5 molar equivalent of a substantially anhydrous acetic acid, continuing the reaction until the desired polymeric zirconium compound is formed, and recovering said compound in purified state from the reaction products.

11. A method for preparing a stable, organic solvent-soluble polymeric zirconium compound which comprises heating tetraethyl zirconate and at least 0.5 molar equivalent of substantially anhydrous linseed oil acids, continuing the reaction until the desired polymeric zirconium compound is formed, and recovering said compound in purified state from the reaction products.

References Cited in the file of this patent

UNITED STATES PATENTS

| Number | Name | Date |
| --- | --- | --- |
| 2,467,177 | Zimmer | Apr. 12, 1949 |
| 2,490,691 | Langkammerer | Dec. 6, 1949 |
| 2,621,193 | Langkammerer | Dec. 9, 1952 |

OTHER REFERENCES

Winter Journal Oil and Color Chem. Assoc., page 31, vol. 34, January 1951.

Bradly et al., J. Chem. Soc. (London) 1950, pages 3450–3454.

Nature, vol. 165, pages 75–76, January 1950.